United States Patent [19]
Schmitz et al.

[11] Patent Number: 5,960,803
[45] Date of Patent: Oct. 5, 1999

[54] METHOD AND DEVICE FOR CLEANING SEPTIC SYSTEMS

[76] Inventors: Peter J. Schmitz, 13667 Meridian Ave. N.; Alan A. Schmitz, 13353 Acadia Ave. N.E., both of Monticello, Minn. 55362

[21] Appl. No.: 08/808,884

[22] Filed: Feb. 28, 1997

Related U.S. Application Data

[60] Provisional application No. 60/012,495, Feb. 26, 1996.
[51] Int. Cl.⁶ ....................................................... B08D 9/08
[52] U.S. Cl. ...................... 134/22.18; 134/21; 210/532.2; 210/608
[58] Field of Search .................................. 134/22.18, 21; 210/532.2, 608

[56] References Cited

U.S. PATENT DOCUMENTS

| | | |
|---|---|---|
| 3,896,027 | 7/1975 | Digney et al. . |
| 3,951,804 | 4/1976 | Smith . |
| 4,002,561 | 1/1977 | Traverse . |
| 4,527,319 | 7/1985 | Rosenbaum et al. . |
| 4,605,501 | 8/1986 | Tyson . |
| 4,793,386 | 12/1988 | Sloan . |
| 5,194,144 | 3/1993 | Blough . |
| 5,380,427 | 1/1995 | Foss . |
| 5,657,782 | 8/1997 | Berning . |

FOREIGN PATENT DOCUMENTS 2231821  12/1974  France .

OTHER PUBLICATIONS

Derwent Abstract No. 008950951, Sirtoninski et al., SU Patent No. 1654478, Jul. 1991.
R. Machmeier, "Town and Country Sewage Treatment", University of Minnesota Extension Service.

*Primary Examiner*—Jan Ludlow
*Attorney, Agent, or Firm*—Fredrikson & Byron, P.A.

[57] ABSTRACT

A method of using a device for use in cleaning septic tanks, comprising a rotatable blade for breaking up the scum layer within a septic tank, power drive for turning the blade with sufficient power to break up the scum, and driveshaft for operably connecting the blade to the power drive. The device can be used as a septic tank agitator, in order to liquefy the scum, liquid and sludge components within the tank, within a period of time far shorter than the traditional method of back-flushing to disrupt the layer.

20 Claims, 2 Drawing Sheets

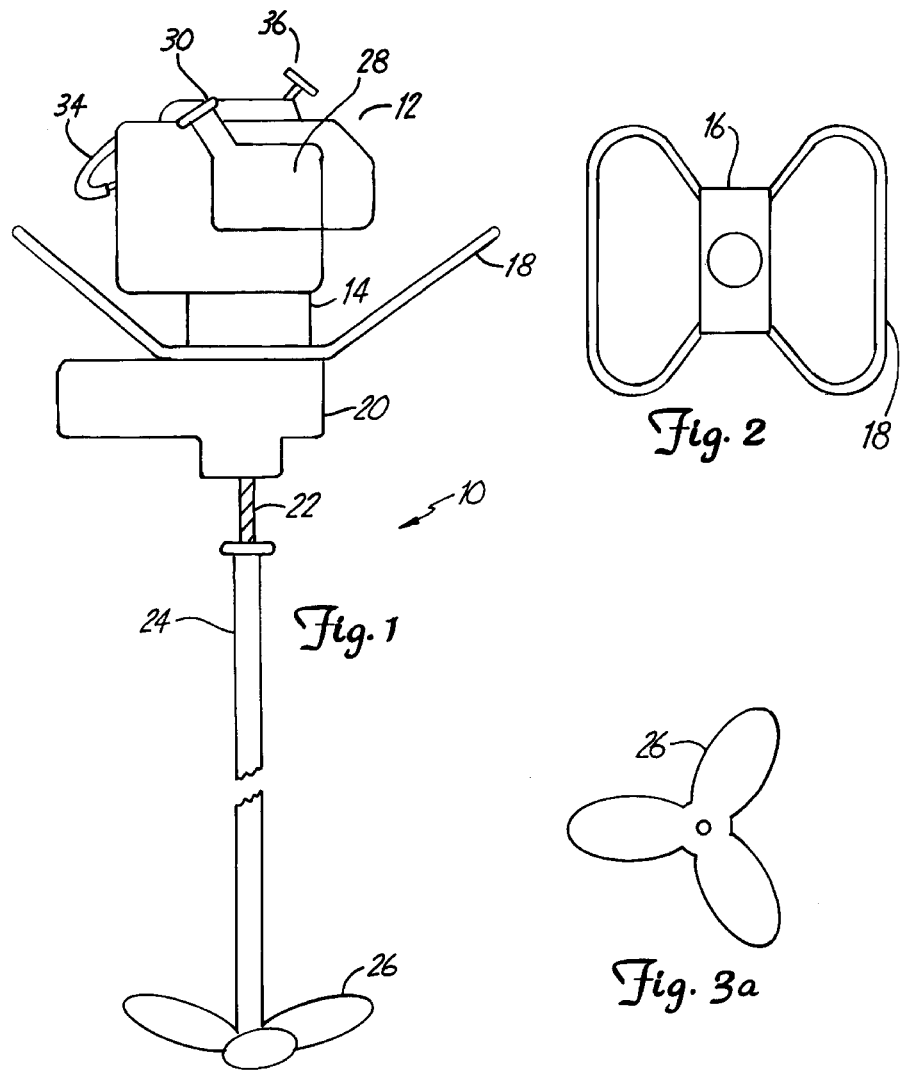
Fig. 1
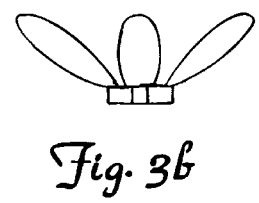
Fig. 2
Fig. 3a
Fig. 3b
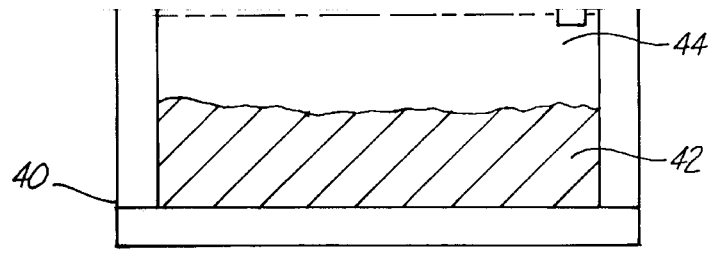

METHOD AND DEVICE FOR CLEANING SEPTIC SYSTEMS

This application claims the benefit of U.S. Provision application Ser. No. 60/012,495 filed Feb. 26, 1996.

TECHNICAL FIELD

The present invention relates to septic tanks, and in particular to methods for cleaning and emptying septic tanks. In another aspect, the invention relates to augers and related hand-held powered apparatuses.

BACKGROUND OF THE INVENTION

The most common domestic wastewater treatment system used today in rural areas is the septic tank-soil absorption system. An underground septic tank removes settleable and floatable solids from the wastewater by forming, respectively, a sludge component and an upper scum component. The soil absorption field then filters and treats clarified tank effluent and distributes it throughout the soil. Removing solids from the wastewater in this manner protects the soil absorption system from clogging and failure.

Abstracts are provided for the following recent patents or applications dealing with the subject of septic or related systems and improvements thereon, namely, U.S. Pat. Nos. 4,527,319 (Rosenbaum et al.), 4,605,501 (Tyson), 5,194,144 (Blough), 5,380,427 (Foss), JP 7233532 (Toda Kensetu KK), JP 88022880 (Maruichi Seisakusho), CN 1041805 (Lu), and SU 1654478 (Sirotinski et al.), Conventional septic systems typically remove solids by holding wastewater in an underground tank. The heavier solids are allowed to settle to the bottom as sludge, and the lighter particles float to the top in order to form a scum layer. As the system is used, the sludge layer continues to accumulate in the bottom of the tank. Properly designed tanks provide enough space for two to three years of safe accumulation of sludge. If too much sludge accumulates settling occurs more slowly, or not at all, meaning that more solids may escape into the absorption area. To prevent this, the tank must be pumped periodically.

Underground tanks are typically cleaned by pumping the contents to a tanker truck using equipment specially designed for the job. See, e.g., R. Machmeier, "Town and Country Sewage Treatment", University of Minnesota Extension Service.

The removal of septic tank contents, and particularly the solids, is a difficult and time-consuming process. The job typically needs to be performed by a professional technician having adequate equipment, including a tanker truck. The first task involved in cleaning a tank is to break up the upper scum layer, and cause it to be reconstituted with the liquid layer and sludge. Over time, the scum layer can become hardened and quite difficult to break. Yet it must be broken, and resuspended with the other layers in order to be removed.

Typically cleaning is accomplished by a backflushing process, using the pump on the tanker trunk. A portion of the liquid layer is first drawn up and then rapidly expelled back into the tank under pressure to agitate all the solids into suspension. This process is repeated several times before the contents can be removed. If the scum layer is hard, it may also be necessary to agitate the tank with air or to use a long-handled shovel through the manhole to break up the sum. When all the solids have finally been resuspended, the mixture (known as septage) is pumped out of the septic tank into the pumper tank.

This backflushing process can often take over an hour or more, particularly with systems that have not been cleaned for an extended period, and/or in situations in which the tank truck is far from the tank (thereby decreasing the available pressure).

What is clearly need are means for improving the ability to break the upper crust or scum layer within a tank, in order to simplify and speed the process of cleaning septic tanks.

SUMMARY OF THE INVENTION

The present invention provides a device for use in cleaning septic tanks, the device comprising a rotatable blade for breaking up the scum layer within a septic tank, power means for turning the blade with sufficient power to break up the scum, and driveshaft means for operably connecting the blade to the power means. Preferably the device is sufficiently portable to be carried from site to site and used by a single operator, and can be disassembled for safe and effective storage and transport.

In a preferred embodiment, the power means comprise an electric- or fuel-powered engine, the blade is provided in the form of a multibladed propeller, and the driveshaft is on the order of 70 to 90 inches in overall length. Although the blade can be driven by any suitable means, including direct driven, it is preferably gear driven.

In the method of the invention, the device is used as a septic tank agitator, in order to liquefy the scum, liquid and sludge components within the tank prior to emptying the tank. The operator can hold the device above the open tank manhole and insert the blade into the tank in order to agitate the tank contents. The engine, and in turn the blade, have sufficient power, and the shaft is of sufficient length, to allow the operator to break the scum layer and fully resuspend the scum and sludge components with the liquid layer. Most surprisingly, the entire process can be shortened considerably, from the on the order of one-half hour to an hour or more, to on the order of 15 minutes or less.

In turn, the septage can then be pumped to a tank in far less time than with standard back-flushing, thus saving time and preventing solids from plugging or flowing into the outlet pipe. The method also conforms well with state codes requiring the pumper to remove all forms of solids from the septic tank.

BRIEF DESCRIPTION OF THE DRAWING

In the Drawing:

FIG. 1 provides a side view of a device of the present invention.

FIG. 2 shows a top view of the handle bars of the device shown in FIG. 1.

FIG. 3 shows a top view of the propeller of the device shown in FIG. 1.

DETAILED DESCRIPTION

Figure 4:
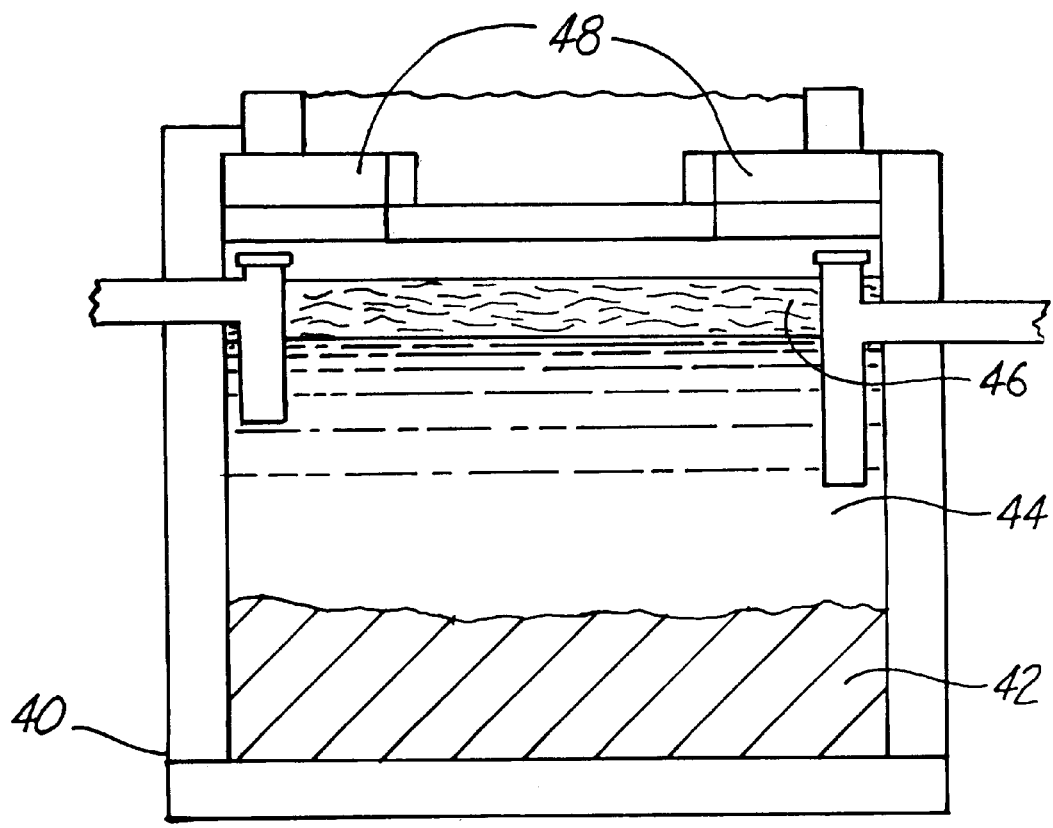
FIG. 4 provides a cross-sectional view of an underground septic tank system.

The invention will be further described with reference to the Drawing. In a preferred embodiment, as shown in FIG. 1, the device 10 comprises a small engine 12. The engine is preferably on the order of about 25 cc to about 100 cc displacement. The engine provides about 1 to about 10 horsepower, and preferably about 2 to about 3 horsepower. Preferably, the engine is mounted at the uppermost portion of the device, with its driving mechanism extended in a vertical position with respect to the ground.

Preferably a clutch assembly 14 is operably connected with the bottom portion of the engine, the clutch serving to engage and disengage the driving mechanism of the engine with the driveshaft during operation.

The device further comprises grasping means, e.g., in the form of handle assembly 18. As can be seen in FIG. 2, assembly 18 is provided in the form of a substantially flat piece of metal 16, which can be formed with, or rigidly connected to, tubular butterfly-style handle bars 18. Portion 16 further provides an aperture through which the engine and driveshaft can be mounted and connected in an operable manner.

The device further comprises a suitable gear box, preferably connected to and positioned under the butterfly handle bars. A gearbox such as that depicted by reference number 20 in FIG. 1 can provide any desirable gear ratio, with a ratio between about 5:1 and about 20:1 being suitable, and between about 10:1 to about 13:1 being presently preferred.

Applicants have found that the relationship between engine power and gear box ratio (and in turn, revolutions per minute) is an important aspect in constructing a device. The device should provide an optimal combination of such properties as sufficient power for disrupting and agitating the scum layer, a propeller diameter capable of being fit through available opening diameters, and a convenient overall weight of the device.

On one side of engine 12 there is provided a throttle cable 21 connected to the grasping portion of the butterfly handle bar. The throttle will control the speed of the engine's rotations per minute ("RPM"), which in turn will control the RPM's of the propeller. The device further comprises a gas tank 28 and filling spout 30, as well as a spark plug 32 and spark plug wire 34, and finally, a starter rope 36.

The driveshaft means for operably connecting gear box 20 with blade assembly 26 can be of any suitable type or configuration. FIG. 1 depicts a preferred embodiment in which a gearbox shaft 22 emanates from gear box 20, and is matably and operably connected with driveshaft 24. The outer diameter of the gearbox shaft can be on the order of 0.5 inches to 2 inches, and is preferably on the order of ⅞ inch to 1 inch.

The gearbox shaft is capable of releasable attachment to a driveshaft 24, thereby permitting the device to be disassembled for storage or transport, or allowing driveshafts of varying lengths to be used. Any suitable means can be used for connecting the driveshaft to the gearbox or gearbox shaft. For instance, as shown in FIG. 1, driveshaft 24 is provided with a hollow center, at least in an uppermost region of sufficient length to engage the gearbox shaft.

The inner diameter of the driveshaft 24 is of sufficient dimension to allow gearbox shaft 22 to be inserted and retained, e.g., the length of the gearbox shaft. The gearbox shaft and the driveshaft can be held together by any suitable means, e.g., by a ⅜ allen head hexscrew having a safety cover collar. The length of the driveshaft will typically depend on the dimensions of the tank and/or its distance underground. Typically, and for most conventional septic tanks, the driveshaft will be on the order of about 70 to about 90 inches in length, and more preferably between about 75 inches and about 85 inches in length. Optionally, the device can be provided with alternative driveshafts, or extenders in order to accommodate different tanks.

The bottom end of the driveshaft is fixably attached (e.g., welded or releasably attached) to the blade assembly 26. The blade can be attached in any suitable configuration with respect to the driveshaft, e.g., such that its plane of rotation is either parallel or perpendicular with the axis of the shaft.

Blade assembly 26 is preferably provided in the form of two or three blade propeller, in which the individual blades are spaced substantially evenly apart. The overall blade diameter is on the order of about 5 to about 20 inches, and preferably about 10 to about 12 inches, in order to ensure that the blade portion will safely and easily fit through conventional manhole openings. As shown in FIG. 3(*a*), each propeller is approximately 4 inches wide by 5½–6 inches long. Preferably, and as seen in FIG. 3(*b*), each of the three blades are bent up at approximately 40° angle on the side in the direction the propeller is rotating. The fact that the blades are angled significantly improves the overall efficiency of the device, both in terms of initially breaking through the scum and thereafter in terms of agitating the scum and other layers.

Particularly for use with smaller access holes, the blade assembly can optionally be provided in a collapsed, insertable form. For instance, the assembly can be provided in the form of two or more blade portions that can be retracted along the axis of the shaft in order to allow them to be easily inserted. Once within the tank the blades are expandable, in that they can extend out into a substantially horizontal orientation, for instance, by the centrifugal force of the turning shaft. Upon completion, the propellers can again be retracted in order to remove the blade from the tank.

Optionally, and preferably, the device further comprises one or more safety devices in order to improve its safety in use. Such devices include, but are not limited to, and automatic shutoff device intended to stop the rotating shaft when the blade begins to kick back, throttle latches for safer starting, and safety triggers to prevent accidental acceleration, muffler shields to protect the operator from contact with the heated surface.

The use of such a device will be discussed with reference to the diagram of a typical septic tank in FIG. 4. As can be seen, the contents of the tank will include a bottom sludge layer 42, and liquid layer 44 and an upper scum layer 46. Access to these layers can be obtained by means of a pair of manhole covers 48, which are generally each about 24 inches in diameter.

In the method of the invention, a device such as described herein above can be quickly and easily used to break up even hardened scum within in septic tank. Additionally, the blade can be used to resuspend the sludge, in order to form a relatively homogeneous liquid for removal as septate. As with any such powered device, the device of the present invention must be used carefully and by a technician with adequate precautions and training, in order to assure its safe use.

The device is generally used by first inserting the blade or propeller through the manhole cover and into the septic tank. The engine is then started, and once it is running, the clutch lever can be released in order to engage the shaft. The rotating blade is moved into and around the scum layer in order to break it up. Similarly, the blade is lowered in the tank in order to reach and agitate the sludge at the bottom of the tank.

The progress and extent of mixing can be determined using any suitable means. Generally, the process of agitating the contents is complete when no visible portion of the scum layer is visible through the manhole, and when further agitation of the sludge layer produces no discernable difference in the appearance or consistency of the septage.

Generally, the contents of the tank can be fully agitated and resuspended in on the order of one half hour or less, preferably on the order of 15 minutes or less, and more preferably on the order of 5 minutes or less. Compared to the usual length of time associated with conventional backflushing processes, which can easily take on the order of an hour to accomplish, this equates with a time frame that is on the order of one-half or less, preferably one-fourth or less, and more preferably one-tenth or less of the time previously needed before the technician can begin finally pumping the contents out.

Once completed, the resuspended contents can be quickly and easily pumped to the truck using conventional means.

What is claimed is:

1. A method of cleaning a septic tank, the method including the steps of (a) providing an operator-held device comprising a rotatable blade for breaking up the scum layer within a septic tank, power means for turning the blade in contact with the scum layer and with sufficient power to break up the scum, and driveshaft means for operably connecting the blade to the power means, (b) employing the device as a septic tank agitator in order to liquefy the scum, liquid and sludge components within the tank, and (c) emptying the tank.

2. A method according to claim 1 wherein step (b) is performed by a single operator holding the device above an open tank manhole and inserting the blade into the tank in order to agitate the tank contents and step (c) is performed using a suction hose separate from the operator held-device.

3. A method according to claim 1 wherein the resuspension of the scum, liquid and sludge components within the tank occurs within on the order of one-half hour or less.

4. A method according to claim 3 wherein the resuspension of the components occurs within on the order of 15 minutes or less.

5. A method according to claim 1, wherein the device is adapted to be portable, and is carried and used by a single operator.

6. A method according to claim 1 wherein the device is adapted to be disassembled for safe and effective storage and transport.

7. A method according to claim 1 wherein the power means comprise an electric- or fuel-powered engine.

8. A method according to claim 1 wherein the blade is provided in the form of a multibladed propeller.

9. A method according to claim 1 wherein the driveshaft is on the order of 70 to 90 inches in overall length.

10. A method according to claim 8 wherein the multibladed propeller is direct driven.

11. A method according to claim 8 wherein the multibladed propeller is gear driven.

12. A method according to claim 8 wherein the multibladed propeller is collapsible along the axis of the driveshaft.

13. A method according to claim 12 wherein the propeller is expanded by centrifugal force upon rotation of the driveshaft.

14. A method according to claim 7 wherein the power means is a fuel-powered engine that provides on the order of about 25 cc to about 100 cc displacement.

15. A method according to claim 14 wherein the engine provides about 1 to about 10 horsepower.

16. A method according to claim 15 wherein the engine provides about 2 to about 3 horsepower.

17. A method according to claim 1, wherein the device is adapted to be portable, and is carried and used by a single operator, the power means comprise an electric- or fuel-powered engine, and the blade is provided in the form of a multibladed propeller.

18. A method according to claim 17, wherein the device is adapted to be disassembled for safe and effective storage and transport, the multibladed propeller is either direct driven or gear driven, and the power means is a fuel-powered engine that provides on the order of about 25 cc to about 100 cc displacement to provide about 1 to about 10 horsepower.

19. A method according to claim 18 wherein the driveshaft is on the order of 70 to 90 inches in overall length, the multibladed propeller is collapsible along the axis of the driveshaft, and the engine provides about 2 to about 3 horsepower.

20. A method according to claim 19, wherein the propeller is expanded by centrifugal force upon rotation of the driveshaft.

* * * * *